US008401727B2

(12) United States Patent
Arlt et al.

(10) Patent No.: US 8,401,727 B2
(45) Date of Patent: Mar. 19, 2013

(54) METHOD AND DEVICE FOR THE DIAGNOSIS OF AN NOX SENSOR FOR AN INTERNAL COMBUSTION ENGINE

(75) Inventors: Tino Arlt, Regensburg (DE); Thomas Baumann, Regensburg (DE); Muammer Kilinc, Regensburg (DE); Tim Walde, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 319 days.

(21) Appl. No.: 12/992,331

(22) PCT Filed: Apr. 16, 2009

(86) PCT No.: PCT/EP2009/054505
§ 371 (c)(1),
(2), (4) Date: Nov. 17, 2010

(87) PCT Pub. No.: WO2009/141198
PCT Pub. Date: Nov. 26, 2009

(65) Prior Publication Data
US 2011/0077818 A1 Mar. 31, 2011

(30) Foreign Application Priority Data
May 19, 2008 (DE) .......................... 10 2008 024 177

(51) Int. Cl.
*F01N 11/00* (2006.01)
(52) U.S. Cl. ..................... 701/29.1; 701/29.7; 701/34.4; 702/183
(58) Field of Classification Search ................. 701/29.1, 701/27.7–27.8, 34.4, 105, 108–109; 702/182–185
See application file for complete search history.

(56) References Cited

U.S. PATENT DOCUMENTS

| 6,453,663 B1 | 9/2002 | Orzel et al. ...................... 60/277 |
| 6,645,367 B1 | 11/2003 | Zhang et al. .................. 205/781 |
| 6,990,799 B2 | 1/2006 | Bidner et al. .................... 60/277 |

(Continued)

FOREIGN PATENT DOCUMENTS

| DE | 19819462 | 11/1999 |
| DE | 19828928 | 1/2000 |

(Continued)

OTHER PUBLICATIONS

German Office Action, German Patent application No. 10 2008 024 177,6-26, 2 pages, Nov. 21, 2008.
International Search Report and Written Opinion for Application No. PCT/EP2009/054505 (11 pages), Aug. 14, 2009.

*Primary Examiner* — Yonel Beaulieu
(74) *Attorney, Agent, or Firm* — King & Spalding L.L.P.

(57) ABSTRACT

In a method and a device for the diagnosis of an NOx sensor (54) for an internal combustion engine, during a homogenous operation of the internal combustion engine, a base diagnostic value (NOx_DIAG_BAS) of the NOx sensor (54) is determined as a function of a reference value (I_REF) of a measuring signal of the NOx sensor (54) determined in a new state of the NOx sensor (54) and a current value (I_AV) of the measuring signal of the NOx sensor (54). A time-dependent measuring value sequence (O2_EG_T) of the oxygen content of the exhaust gas in the exhaust gas system (14) is determined by the exhaust gas probe (53). Depending on the measuring value sequence (O2_EG_T) of the oxygen content of the exhaust gas, and the base diagnostic value (NOx_DIAG_BAS) of the NOx sensor (54), a corrected diagnostic value (NOx_DIAG_COR) is determined for the NOx sensor (54).

19 Claims, 2 Drawing Sheets

U.S. PATENT DOCUMENTS

| | | | |
|---|---|---|---|
| 7,502,683 B2 * | 3/2009 | Rodatz et al. | 701/103 |
| 2006/0196479 A1 * | 9/2006 | Weiss et al. | 123/478 |
| 2007/0244621 A1 * | 10/2007 | Rosel et al. | 701/101 |
| 2008/0120017 A1 * | 5/2008 | Rodatz et al. | 701/108 |

FOREIGN PATENT DOCUMENTS

| | | |
|---|---|---|
| DE | 10300939 | 7/2004 |
| EP | 1134378 | 9/2001 |

* cited by examiner

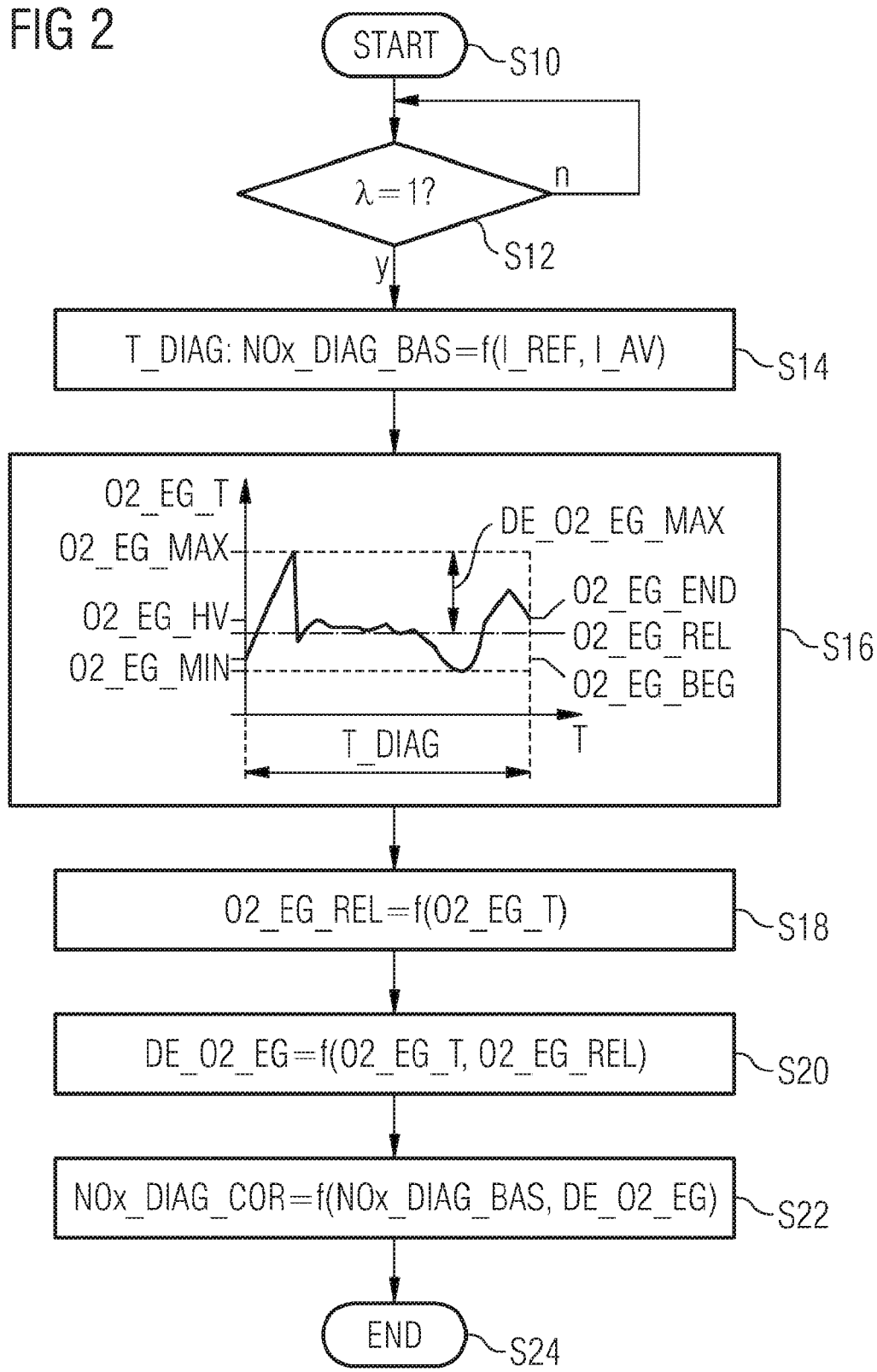

METHOD AND DEVICE FOR THE DIAGNOSIS OF AN NOX SENSOR FOR AN INTERNAL COMBUSTION ENGINE

CROSS-REFERENCE TO RELATED APPLICATIONS

This application is a U.S. National Stage Application of International Application No. PCT/EP2009/054505 filed Apr. 16, 2009, which designates the United States of America, and claims priority to German Application No. 10 2008 024 177.6 filed May 19, 2008, the contents of which are hereby incorporated by reference in their entirety.

TECHNICAL FIELD

The invention relates to a method and a device for diagnosing an NOx sensor for an internal combustion engine.

BACKGROUND

As a consequence of increasingly strict legal regulations concerning permissible harmful emissions in motor vehicles which have internal combustion engines, the harmful emissions must be kept as low as possible during operation of the internal combustion engine. On one hand, this can be achieved by reducing the harmful emissions that are produced during the combustion of the air/fuel mixture in the respective cylinder of the internal combustion engine. On the other hand, exhaust gas postprocessing systems are used in internal combustion engines, converting the harmful emissions that are produced during the combustion process of the air/fuel mixture in the respective cylinder into harmless substances. Catalytic converters are used for this purpose, converting carbon monoxide, hydrocarbons and nitrogen oxide into harmless substances. Both selectively influencing the generation of harmful emissions during the combustion, and efficiently converting the harmful components by means of a catalytic converter for exhaust gases, require the air/fuel ratio in the respective cylinder to be adjusted very precisely.

In this context, it must be ensured that the components of the exhaust gas postprocessing system also function in the desired manner for a long period of operation, and that faults can be reliably detected.

NOx sensors are used for determining the nitrogen oxide content in the exhaust gas downstream of the catalytic converter.

An NOx sensor which is based on a $ZrO_2$ ceramic and has two chambers is disclosed in the textbook entitled "Handbuch Verbrennungsmotoren", edited by Richard von Basshuysen/Fred Schäfer, 2nd edition, Jun. 2002, published by Friedrich Vieweg & Sohn Verlagsgesellschaft mbH Braunschweig/Wiesbaden, page 589 ff. In the first chamber, a constant partial pressure of the oxygen contained in the exhaust gas is produced by applying a pump flow. The pump flow is inversely proportional to the air/fuel ratio. In the second chamber, the nitrogen oxide contained in the exhaust gas is decomposed by application of a further flow. This flow is proportional to the nitrogen oxide content in the exhaust gas and forms the measurement signal of the NOx sensor.

Components in the exhaust gas can cause contamination of the NOx sensor. This can make it necessary to carry out a diagnosis of the NOx sensor during routine operation of the internal combustion engine, wherein a check is performed under specified conditions in order to establish how the determined measurement signal of the NOx sensor correlates to the measurement signal of the NOx sensor in its new state.

SUMMARY

According to various embodiments, a method and a device for diagnosing an NOx sensor for an internal combustion engine can be provided, said method and/or device allowing the internal combustion engine to operate with very low harmful emissions.

According to an embodiment, a method for diagnosing an NOx sensor for an internal combustion engine, which has at least one cylinder comprising a combustion chamber, and an exhaust gas tract, wherein the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas, wherein a diagnosis of the NOx sensor is carried out in a predefined diagnosis period during homogenous operation of the internal combustion engine, may comprise: —in the diagnosis period, a base diagnostic value of the NOx sensor is determined depending on a reference value of a measurement signal of the NOx sensor, said reference value being determined in a new state of the NOx sensor, and a current value of the measurement signal of the NOx sensor, —in the diagnosis period, a time-dependent sequence of measured values of the oxygen content of the exhaust gas in the exhaust gas tract is determined by means of the exhaust gas probe, —depending on the sequence of measured values of the oxygen content of the exhaust gas and the base diagnostic value of the NOx sensor, a corrected diagnostic value of the NOx sensor is specified.

According to a further embodiment, depending on the sequence of measured values of the oxygen content of the exhaust gas, a reference value for an oxygen content of the exhaust gas in the exhaust gas tract can be determined, depending on the temporal profile of the sequence of measured values of the oxygen content of the exhaust gas in the diagnosis period, a characteristic value can be determined for the deviation of the oxygen content of the exhaust gas in the diagnosis period from the reference value for the oxygen content of the exhaust gas, and depending on the characteristic value for the deviation of the oxygen content of the exhaust gas in the diagnosis period from the reference value for the oxygen content of the exhaust gas, the corrected diagnostic value of the NOx sensor can be specified. According to a further embodiment, the reference value for the oxygen content of the exhaust gas can be a minimum value, a maximum value or an average value of the captured oxygen content of the exhaust gas in the diagnosis period. According to a further embodiment, the reference value for the oxygen content of the exhaust gas can be a value of the captured oxygen content of the exhaust gas at the start or a value of the captured oxygen content of the exhaust gas at the end of the diagnosis period. According to a further embodiment, the characteristic value for the deviation of the oxygen content of the exhaust gas in the diagnosis period from the reference value for the oxygen content of the exhaust gas can be dependent on the amount of the maximum deviation of the captured oxygen content of the exhaust gas in the diagnosis period from the reference value for the oxygen content of the exhaust gas. According to a further embodiment, the characteristic value for the deviation of the oxygen content of the exhaust gas in the diagnosis period from the reference value for the oxygen content of the exhaust gas can be dependent on an integral of the sequence of measured values of the deviations of the captured oxygen content of the exhaust gas in the diagnosis period from the reference value for the oxygen content of the exhaust gas. According to a further embodiment, the characteristic value for the deviation of the oxygen content of the exhaust gas in the diagnosis period from the reference value for the oxygen content of the exhaust gas can be dependent on a temporally weighted integral of the sequence of measured values relative to the reference value for the oxygen content of the exhaust gas. According to a further embodiment, the characteristic value for the deviation of the oxygen content of the exhaust gas in the diagnosis period from the reference value for the oxygen content of the exhaust gas can be dependent on an integral, which is weighted relative to an exhaust gas mass flow, of the sequence of measured values relative to the reference value for the oxygen content of the exhaust gas.

According to another embodiment, a device for diagnosing an NOx sensor for an internal combustion engine, which has at least one cylinder comprising a combustion chamber, and an exhaust gas tract, wherein the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas, wherein the device is designed to carry out a diagnosis of the NOx sensor in a predefined diagnosis period during homogenous operation of the internal combustion engine, —to determine a base diagnostic value of the NOx sensor in the diagnosis period depending on a reference value of a measurement signal of the NOx sensor, said reference value being determined in a new state of the NOx sensor, and a current value of the measurement signal of the NOx sensor, —to determine a time-dependent sequence of measured values of the oxygen content of the exhaust gas in the exhaust gas tract in the diagnosis period by means of the exhaust gas probe, —to specify a corrected diagnostic value of the NOx sensor depending on the sequence of measured values of the oxygen content of the exhaust gas and the base diagnostic value of the NOx sensor.

According to yet another embodiment, a system may comprise a device as described above and an internal combustion engine, which has at least one cylinder comprising a combustion chamber, and an exhaust gas tract, and the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas.

According to a further embodiment of the system, the device can be arranged in the NOx sensor. According to a further embodiment of the system, the device can be arranged in a control device of the internal combustion engine.

BRIEF DESCRIPTION OF THE DRAWINGS

Exemplary embodiments are explained in greater detail below with reference to the schematic drawings, in which:

FIG. 2 shows an illustration of a method for specifying the mass for an NOx emission.

Figure 1:
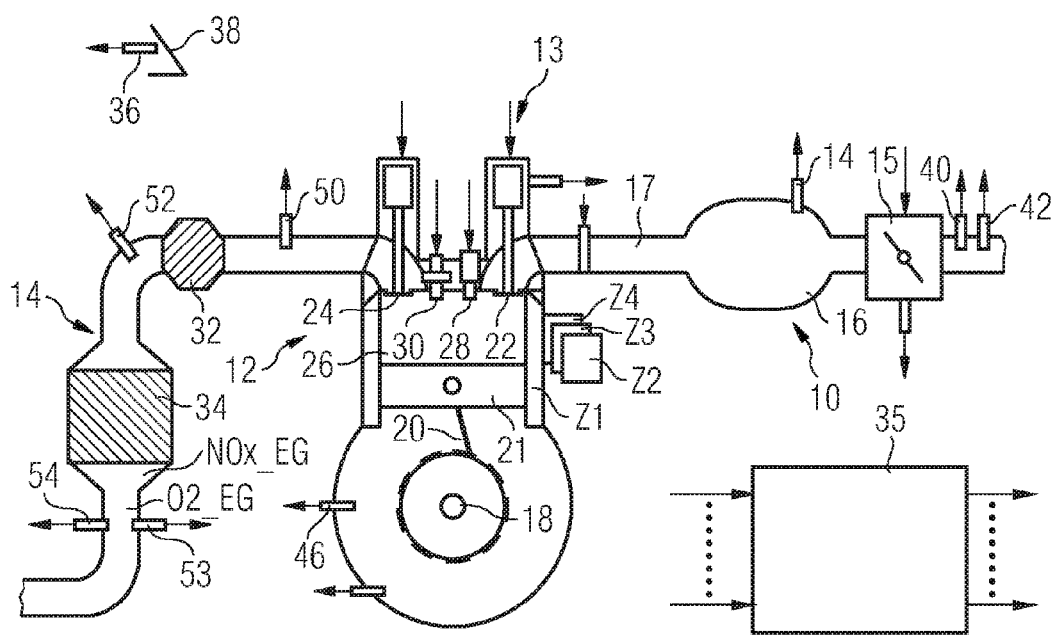
FIG. 1 shows an internal combustion engine comprising a control device.

Elements having identical construction or function are identified by the same reference signs throughout the figures.

DETAILED DESCRIPTION

According to a first and a second aspect of various embodiments, a method and a corresponding device can be provided for diagnosing an NOx sensor for an internal combustion engine, which has at least one cylinder comprising a combustion chamber, and an exhaust gas tract, wherein the NOx sensor and an exhaust gas sensor are arranged in a shared section of the exhaust gas tract, where the chemical and physical properties of the exhaust gas are essentially analogous, wherein the NOx sensor is designed to capture an NOx concentration of the exhaust gas and the exhaust gas sensor is designed to capture an oxygen content of the exhaust gas in the exhaust gas tract.

A diagnosis of the NOx sensor is carried out in a predefined diagnosis period during homogeneous operation of the internal combustion engine, wherein in the diagnosis period a base diagnostic value of the NOx sensor is determined depending on a reference value of a measurement signal of the NOx sensor (said reference value being determined in the new state of the NOx sensor) and a current value of the measurement signal of the NOx sensor, wherein in the diagnosis period a time-dependent sequence of measured values of the oxygen content of the exhaust gas in the exhaust gas tract is determined by means of the exhaust gas sensor, and wherein a corrected diagnostic value of the NOx sensor is specified depending on the sequence of measured values of the oxygen content of the exhaust gas and the base diagnostic value of the NOx sensor.

In particular, the diagnosis of the NOx sensor takes place during homogeneous operation of the internal combustion engine, when a quasi-stoichiometric (in particular essentially stoichiometric on average) air/fuel ratio is present, i.e. the air/fuel ratio fluctuates slightly around its stoichiometric value. The conditions of compatibility of such an operating state are generally very well known and easily reproducible. Furthermore, the exhaust gas sensor and the NOx sensor are arranged together in a shared section of the exhaust gas tract, where there are no components such as catalytic converters, or similar, which could change the chemical composition or the physical properties of the exhaust gas.

The method for diagnosing the NOx sensor has the advantage that a diagnosis of the NOx sensor can also be carried out in the event of changes in the residual oxygen content in the exhaust gas, without having to terminate the diagnosis.

According to an embodiment, depending on the sequence of measured values of the oxygen content of the exhaust gas, a reference value is determined for an oxygen content of the exhaust gas in the exhaust gas tract, depending on the temporal profile of the sequence of measured values of the oxygen content of the exhaust gas in the diagnosis period, a characteristic value is determined for the deviation of the oxygen content of the exhaust gas in the diagnosis period from the reference value for the oxygen content of the exhaust gas, and depending on the characteristic value for the deviation of the oxygen content of the exhaust gas in the diagnosis period from the reference value for the oxygen content of the exhaust gas, the corrected diagnostic value of the NOx sensor is specified. The reference value for the oxygen content of the exhaust gas in the exhaust gas tract is particularly easy to determine. Likewise, the characteristic value for the deviation of the oxygen content of the exhaust gas in the diagnosis period from the reference value for the oxygen content of the exhaust gas can be determined in many different ways.

According to a further embodiment, the reference value for the oxygen content of the exhaust gas is a minimum value, a maximum value or an average value of the captured oxygen content of the exhaust gas in the diagnosis period. This has the advantage that these values are reference variables which can easily be specified for the oxygen content of the exhaust gas in the diagnosis period.

According to a further embodiment, the reference value for the oxygen content of the exhaust gas is a value of the captured oxygen content of the exhaust gas at the start of the diagnosis period or a value of the captured oxygen content of the exhaust gas at the end of the diagnosis period. This has the advantage that these are reference variables which can easily be specified for the oxygen content of the exhaust gas in the diagnosis period.

According to a further embodiment, the characteristic value for the deviation of the oxygen content of the exhaust gas in the diagnosis period from the reference value for the oxygen content of the exhaust gas is dependent on the amount of the maximum deviation of the captured oxygen content of the exhaust gas in the diagnosis period from the reference value for the oxygen content of the exhaust gas. This has the advantage that these are reference variables which can easily be specified for the oxygen content of the exhaust gas in the diagnosis period. Moreover, the direction of the deviation of the oxygen content of the exhaust gas during the diagnosis period can easily be taken into consideration.

According to a further embodiment, the characteristic value for the deviation of the oxygen content of the exhaust gas in the diagnosis period from the reference value for the oxygen content of the exhaust gas is dependent on an integral of the deviations of the captured oxygen content of the exhaust gas in the diagnosis period from the reference value for the oxygen content of the exhaust gas. This has the advantage that duration and direction of the deviation of the oxygen content of the exhaust gas during the diagnosis period can be taken into consideration in this way.

According to a further embodiment, the characteristic value for the deviation of the oxygen content of the exhaust gas in the diagnosis period from the reference value for the oxygen content of the exhaust gas is dependent on a temporally weighted integral of the deviations of the captured oxygen content of the exhaust gas in the diagnosis period from the reference value for the oxygen content of the exhaust gas. This has the advantage that both the duration and the direction of the deviation of the oxygen content of the exhaust gas during the diagnosis period can be taken into consideration. It is particularly advantageous that the time of the occurrence of the deviations of the oxygen content of the exhaust gas can be taken into consideration, such that earlier deviations of the oxygen content of the exhaust gas can be weighted more heavily than later deviations of the oxygen content of the exhaust gas. This is significant because deviations of the oxygen content of the exhaust gas at the start of the diagnosis period have greater significance for the correction than deviations of the oxygen content of the exhaust gas which only occur at the end of the diagnosis period.

According to a further embodiment, the characteristic value for the deviation of the oxygen content of the exhaust gas in the diagnosis period from the reference value for the oxygen content of the exhaust gas is dependent on an integral, this being weighted relative to an exhaust gas mass flow, of the deviations of the captured oxygen content of the exhaust gas in the diagnosis period from the reference value for the oxygen content of the exhaust gas. This has the advantage of allowing various operating states of the internal combustion engine, such as idling, partial load or full load, to be included in the diagnosis of the NOx sensor.

According to a third aspect, a system may comprise a device as per the second aspect and an internal combustion engine, which has at least one cylinder comprising a combustion chamber, and an exhaust gas tract. The NOx sensor and an exhaust gas sensor are arranged in a shared section of the exhaust gas tract, where the chemical and physical properties of the exhaust gas are essentially analogous. The NOx sensor is designed to capture an NOx concentration of the exhaust gas and the exhaust gas sensor is designed to capture an oxygen content of the exhaust gas.

According to an embodiment of the third aspect, the device is arranged in the NOx sensor. This allows a compact solution, which is independent of the control device of the internal combustion engine, for the arrangement of the device in the system.

According to a further embodiment of the third aspect, the device is arranged in a control device of the internal combustion engine. This allows an efficient solution, since powerful processors can be provided in the control device of the internal combustion engine.

FIG. 1 shows an internal combustion engine comprising an intake tract 10, an engine block 12, a cylinder head 13 and an exhaust gas tract 14. The intake tract 10 preferably comprises a throttle valve 15, a collector 16, and an induction pipe 17. The induction pipe 17 is routed to a cylinder Z1 in the case of the inlet channel into a combustion chamber 26 of the engine block 12. The engine block 12 comprises a crankshaft 18, which is connected via a connecting rod 20 to a piston 21 of the cylinder Z1.

The cylinder head 13 comprises a valve gear which has a gas inlet valve 22 and a gas outlet valve 24. The cylinder head 13 further comprises an injection valve 28 and a spark plug 30. Alternatively, the injection valve 28 can also be arranged in the induction pipe 17.

An exhaust gas catalytic converter 32 is arranged in the exhaust gas tract 14. Also arranged in the exhaust gas tract is a catalytic converter 34 for reducing NOx.

The internal combustion engine is additionally assigned a control device 35, to which sensors are assigned, wherein said sensors capture various measurement variables and can determine the value of the measurement variables in each case. The control device 35 is designed to determine actuating variables depending on at least one of the measurement variables, wherein said actuating variables can then be converted into one or more actuating signals for controlling actuators by means of corresponding servomechanisms. The control device 35 is designated here as a device for diagnosing the NOx sensor.

The actuators are e.g. the throttle valve 15, the gas inlet and outlet valves 22, 24, the injection valve 28 and the spark plug 30.

The sensors comprise a pedal position sensor 36, which captures an accelerator pedal position of an accelerator pedal 38. The internal combustion engine additionally comprises an air mass sensor 40, which is arranged upstream of the throttle valve 15 and captures an air-mass flow there. A temperature sensor 42 upstream of the throttle valve 15 captures an intake-air temperature. An induction-pipe pressure sensor 44 downstream of the throttle valve 15 is arranged in the collector 16, and captures an induction-pipe pressure in the collector 16. The internal combustion engine additionally comprises a crankshaft angle sensor 46, which captures a crankshaft angle to which a rotational speed of the internal combustion engine can be assigned.

An exhaust gas sensor 50 is arranged upstream of the exhaust gas catalytic converter 32 and captures a residual oxygen content of the exhaust gas, its measurement signal being characteristic of the air/fuel ratio in the combustion chamber of the cylinder Z1 and upstream of the exhaust gas sensor 50 before the oxidation of the fuel. Provision is further made for a lambda probe 52, which is arranged downstream of the exhaust gas catalytic converter 32 and captures a residual oxygen content of the exhaust gas, its measurement signal VLS_DOWN being characteristic of the air/fuel ratio in the combustion chamber of the cylinder Z1 and upstream of the lambda probe 52.

The exhaust gas probe 50 and the lambda probe 52 are preferably binary lambda probes. However, the exhaust gas probe 50 and/or the lambda probe 52 can also be designed individually or together as linear lambda probes in principle.

An exhaust gas probe 53 and an NOx sensor 54 are arranged downstream of the exhaust gas catalytic converter 32. The exhaust gas probe 53 captures a residual oxygen content O2_EG of the exhaust gas, and its measurement signal is characteristic of the air/fuel ratio upstream of the exhaust gas probe 53. The NOx sensor 54 captures an NOx concentration NOx_EG of the exhaust gas upstream of the exhaust gas probe 53. The NOx sensor 54 preferably comprises the exhaust gas probe 53. This has the advantage that only a single sensor need be provided for capturing the NOx concentration and the residual oxygen content O2_EG of the exhaust gas. The NOx sensor 54 is preferably designed to emit a binary lambda signal. This is advantageous because the binary lambda signal is very sensitive in relation to the residual oxygen content O2_EG of the exhaust gas. In principle, however, the NOx sensor 54 can comprise a linear lambda probe.

Depending on the embodiment, provision can be made for any desired subset of the cited sensors, or also for additional sensors.

In addition to the cylinder Z1, provision is preferably made for further cylinders Z2 to Z4, to which corresponding actuators and optionally sensors are likewise assigned.

A system comprises the device for diagnosing the NOx sensor 54, and the internal combustion engine. The system is preferably designed in such a way that the device for diagnosing the NOx sensor 54 is arranged in the NOx sensor 54 itself. It is thus possible to provide a structurally compact solution for the NOx sensor 54 and the device for diagnosing the NOx sensor 54 in one part, said solution being independent from the control device 35 of the internal combustion engine.

In a further embodiment of the system, said system is designed in such a way that the device for diagnosing the NOx sensor 54 is arranged in the control device 35 of the internal combustion engine. This allows an efficient solution, since very powerful processors are usually provided in the control device 35.

For the purpose of performing the diagnosis of the NOx sensor 54 for an internal combustion engine, a program can be stored in a program memory of the control device 35 and executed during the operation of the internal combustion engine. The program can even carry out a diagnosis of the NOx sensor 54 if there is a change in the oxygen content of the exhaust gas in the exhaust gas tract 14, without any need to terminate the diagnosis due to the fluctuation of the residual oxygen content in the exhaust gas.

The program is illustrated in FIG. 2.

The program is started in a step S10, and variables are initialized if applicable. The start preferably takes place when current information is to be determined in relation to the state of the NOx sensor 54. This can take place e.g. at fixed defined time intervals while the internal combustion engine is running, or after a travel distance which can be preset.

In a step S12, a check establishes whether homogenous operation of the internal combustion engine is present, i.e. whether a stoichiometric air/fuel ratio is present (such that the lambda value λ fluctuates around a value of approximately one).

In a further step S14, in a diagnosis period T_DIAG, a base diagnostic value NOx_DIAG_BAS of the NOx sensor 54 is determined depending on a reference value I_REF of a measurement signal of the NOx sensor 54 (said reference value I_REF being determined in a new state of the NOx sensor 54) and a current value I_AV of the measurement signal of the NOx sensor 54. The reference value I_REF of the measurement signal and the current value I_AV of the measurement signal of the NOx sensor 54 are typically pump flows of the measurement chambers in the NOx sensor 54, into which are introduced the exhaust gas whose NOx concentration is to be specified.

In a further step S16, in a predefined diagnosis period T_DIAG, a time-dependent sequence of measured values O2_EG_T of the oxygen content of the exhaust gas in the exhaust gas tract 14 is determined by means of the exhaust gas probe 53.

In a further step S18, depending on the sequence of measured values O2_EG_T of the oxygen content of the exhaust gas, a reference value O2_EG_REL for an oxygen content of the exhaust gas in the exhaust gas tract 14 is determined.

Depending on the application scenario, the reference value O2_EG_REL for the oxygen content of the exhaust gas can be a minimum value O2_EG_MIN, a maximum value O2_EG_MAX or an average value O2_EG_MV of the captured oxygen content of the exhaust gas in the diagnosis period T_DIAG. Furthermore, the reference value O2_EG_REL for the oxygen content of the exhaust gas can be a value O2_EG_BEG of the captured oxygen content of the exhaust gas at the start or a value O2_EG_END of the captured oxygen content of the exhaust gas at the end of the diagnosis period T_DIAG. These reference variables for the oxygen content of the exhaust gas in the diagnosis period T_DIAG can be specified very easily in each case.

In a further step S20, depending on the temporal profile of the sequence of measured values O2_EG_T of the oxygen content of the exhaust gas in the diagnosis period T_DIAG, and on the reference value O2_EG_REL for an oxygen content of the exhaust gas in the exhaust gas tract 14, a characteristic value DE_O2_EG is determined for the deviation of the oxygen content of the exhaust gas in the diagnosis period T_DIAG from the reference value O2_EG_REL for the oxygen content of the exhaust gas. The characteristic value DE_O2_EG for the deviation of the oxygen content of the exhaust gas in the diagnosis period T_DIAG from the reference value O2_EG_REL for the oxygen content of the exhaust gas is determined depending on the amount of a maximum deviation DE_O2_EG_MAX of the oxygen content of the exhaust gas in the diagnosis period T_DIAG from the reference value O2_EG_REL for the oxygen content of the exhaust gas. The maximum deviation DE_O2_EG_MAX of the oxygen content of the exhaust gas in the diagnosis period T_DIAG is a reference variable that can be specified easily for the oxygen content of the exhaust gas in the diagnosis period.

Furthermore, provision is preferably made for the characteristic value DE_O2_EG for the deviation of the oxygen content of the exhaust gas in the diagnosis period T_DIAG from the reference value O2_EG_REL for the oxygen content of the exhaust gas to be specified depending on an integral of the deviations of the oxygen content of the exhaust gas in the diagnosis period T_DIAG from the reference value O2_EG_REL for the oxygen content of the exhaust gas. As a result, the duration and the direction of the deviation of the oxygen content of the exhaust gas during the diagnosis period T_DIAG can be taken into consideration.

Furthermore, provision is preferably made for the characteristic value DE_O2_EG for the deviation of the oxygen content of the exhaust gas in the diagnosis period T_DIAG from the reference value O2_EG_REL for the oxygen content of the exhaust gas to be determined depending on a temporally weighted integral of the deviations of the oxygen content of the exhaust gas in the diagnosis period T_DIAG from the reference value O2_EG_REL for the oxygen content of the exhaust gas. As a result, duration and direction of the deviation of the oxygen content of the exhaust gas value of the diagnosis period T_DIAG can again be taken into consideration. In addition, the time of the occurrence of the deviation can be taken into consideration. Earlier deviations can thus be weighted more heavily than later deviations of the oxygen content of the exhaust gas. Earlier deviations at the start of the diagnosis period T_DIAG have greater significance for the correction than the deviations which only occur at the end of the diagnosis period T_DIAG.

Furthermore, provision is preferably made for the characteristic value DE_O2_EG for the deviation of the oxygen content of the exhaust gas in the diagnosis period T_DIAG from the reference value O2_EG_REL for the oxygen content of the exhaust gas to be specified depending on an integral, said integral being weighted relative to an exhaust gas mass flow, of the deviations of the oxygen content of the exhaust gas in the diagnosis period T_DIAG from the reference value O2_EG_REL for the oxygen content of the exhaust gas. In this case, various operating points of the internal combustion engine, such as idling, partial load or full load, can also be included in the diagnosis of the NOx sensor 54.

In a further step S22, depending on the base diagnostic value NOX_DIAG_BAS of the NOx sensor 54 and on the characteristic value DE_O2_EG for the deviation of the oxygen content of the exhaust gas in the diagnosis period T_DIAG from the reference value O2_EG_REL for the oxygen content of the exhaust gas, a corrected diagnostic value NOX_DIAG_COR of the NOx sensor 54 for the diagnosis period T_DIAG is determined. This represents a corrected diagnostic value for the NOx sensor 54. The corrected diagnostic value NOX_DIAG_COR of the NOx sensor 54 can be specified e.g. by means of a multidimensional characteristic map or using a mathematical equation. In particular, an additive or multiplicative relationship can exist between the base diagnostic value NOX_DIAG_BAS of the NOx sensor 54 and the corrected diagnostic value NOX_DIAG_COR of the NOx sensor 54. The corrected diagnostic value NOX_DIAG_COR of the NOx sensor 54 can be analyzed and countermeasures can be initiated in order to improve the measurement results of the NOx sensor 54 as a result of possible contamination of the NOx sensor 54, e.g. by means of magnesium. In particular, depending on the value of the corrected diagnostic value NOX_DIAG_COR, it is also possible to enter a fault in a fault memory and/or signal a fault report to the driver of the vehicle.

The method ends in a further step S24.

The proposed method for diagnosing the NOx sensor 54 has the advantage that significant deviations and/or scattering of the diagnostic value of the NOx sensor 54 can be avoided in the event of changes in the oxygen content of the exhaust gas, and therefore diagnosis of the NOx sensor 54 no longer needs to be terminated in such circumstances. Furthermore, control circuits and governing circuits of the NOx sensor 54 can easily be corrected in the event of changes in the oxygen content of the exhaust gas.

What is claimed is:

1. A method for diagnosing an NOx sensor for an internal combustion engine, which has at least one cylinder having a combustion chamber, and an exhaust gas tract, wherein the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas, wherein a diagnosis of the NOx sensor is carried out in a predefined diagnosis period during homogenous operation of the internal combustion engine, that the method comprising:

determining, in the diagnosis period, a base diagnostic value of the NOx sensor depending on a reference value of a measurement signal of the NOx sensor, said reference value being determined in a new state of the NOx sensor, and a current value of the measurement signal of the NOx sensor, determining, in the diagnosis period, a time-dependent sequence of measured values of the oxygen content of the exhaust gas in the exhaust gas tract by means of the exhaust gas probe, depending on the sequence of measured values of the oxygen content of the exhaust gas and the base diagnostic value of the NOx sensor, specifying a corrected diagnostic value of the NOx sensor.

2. The method according to claim 1, wherein depending on the sequence of measured values of the oxygen content of the exhaust gas, a reference value for an oxygen content of the exhaust gas in the exhaust gas tract is determined, depending on the temporal profile of the sequence of measured values of the oxygen content of the exhaust gas in the diagnosis period, a characteristic value is determined for the deviation of the oxygen content of the exhaust gas in the diagnosis period from the reference value for the oxygen content of the exhaust gas, and depending on the characteristic value for the deviation of the oxygen content of the exhaust gas in the diagnosis period from the reference value for the oxygen content of the exhaust gas, the corrected diagnostic value of the NOx sensor is specified.

3. The method according to claim 2, wherein the reference value for the oxygen content of the exhaust gas is a minimum value, a maximum value or an average value of the captured oxygen content of the exhaust gas in the diagnosis period.

4. The method according to claim 2, wherein the reference value for the oxygen content of the exhaust gas is a value of the captured oxygen content of the exhaust gas at the start or a value of the captured oxygen content of the exhaust gas at the end of the diagnosis period.

5. The method according to claim 2, wherein the characteristic value for the deviation of the oxygen content of the exhaust gas in the diagnosis period from the reference value for the oxygen content of the exhaust gas is dependent on the amount of the maximum deviation of the captured oxygen content of the exhaust gas in the diagnosis period from the reference value for the oxygen content of the exhaust gas.

6. The method according to claim 2, wherein the characteristic value for the deviation of the oxygen content of the exhaust gas in the diagnosis period from the reference value for the oxygen content of the exhaust gas is dependent on an integral of the sequence of measured values of the deviations of the captured oxygen content of the exhaust gas in the diagnosis period from the reference value for the oxygen content of the exhaust gas.

7. The method according to claim 2, wherein the characteristic value for the deviation of the oxygen content of the exhaust gas in the diagnosis period from the reference value for the oxygen content of the exhaust gas is dependent on a temporally weighted integral of the sequence of measured values relative to the reference value for the oxygen content of the exhaust gas.

8. The method according to claim 2, wherein the characteristic value for the deviation of the oxygen content of the exhaust gas in the diagnosis period from the reference value for the oxygen content of the exhaust gas is dependent on an integral, which is weighted relative to an exhaust gas mass flow, of the sequence of measured values relative to the reference value for the oxygen content of the exhaust gas.

9. A device for diagnosing an NOx sensor for an internal combustion engine, which has at least one cylinder comprising a combustion chamber, and an exhaust gas tract, wherein the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas,
    wherein for carrying out a diagnosis of the NOx sensor in a predefined diagnosis period during homogenous operation of the internal combustion engine device is operable:
        to determine a base diagnostic value of the NOx sensor in the diagnosis period depending on a reference value of a measurement signal of the NOx sensor, said reference value being determined in a new state of the NOx sensor, and a current value of the measurement signal of the NOx sensor,
        to determine a time-dependent sequence of measured values of the oxygen content of the exhaust gas in the exhaust gas tract in the diagnosis period by means of the exhaust gas probe, and
        to specify a corrected diagnostic value of the NOx sensor depending on the sequence of measured values of the oxygen content of the exhaust gas and the base diagnostic value of the NOx sensor.

10. A system comprising a device according to claim 9 and an internal combustion engine, which has at least one cylinder comprising a combustion chamber, and an exhaust gas tract, and the NOx sensor and an exhaust gas probe are arranged in a shared section of the exhaust gas tract, where the chemical and physical properties of the exhaust gas are essentially analogous, wherein the NOx sensor is designed to capture an NOx concentration of the exhaust gas and the exhaust gas probe is designed to capture an oxygen content of the exhaust gas.

11. The system according to claim 10, wherein the device is arranged in the NOx sensor.

12. The system according to claim 10, wherein the device is arranged in a control device of the internal combustion engine.

13. The device according to claim 9, the device further being operable:
    to determine, depending on the sequence of measured values of the oxygen content of the exhaust gas, a reference value for an oxygen content of the exhaust gas in the exhaust gas tract,
    to determine, depending on the temporal profile of the sequence of measured values of the oxygen content of the exhaust gas in the diagnosis period, a characteristic value for the deviation of the oxygen content of the exhaust gas in the diagnosis period from the reference value for the oxygen content of the exhaust gas, and
    to specify, depending on the characteristic value for the deviation of the oxygen content of the exhaust gas in the diagnosis period from the reference value for the oxygen content of the exhaust gas, the corrected diagnostic value of the NOx sensor.

14. The device according to claim 13, wherein the reference value for the oxygen content of the exhaust gas is a minimum value, a maximum value or an average value of the captured oxygen content of the exhaust gas in the diagnosis period.

15. The device according to claim 13, wherein the reference value for the oxygen content of the exhaust gas is a value of the captured oxygen content of the exhaust gas at the start or a value of the captured oxygen content of the exhaust gas at the end of the diagnosis period.

16. The device according to claim 13, wherein the characteristic value for the deviation of the oxygen content of the exhaust gas in the diagnosis period from the reference value for the oxygen content of the exhaust gas is dependent on the amount of the maximum deviation of the captured oxygen content of the exhaust gas in the diagnosis period from the reference value for the oxygen content of the exhaust gas.

17. The device according to claim 13, wherein the characteristic value for the deviation of the oxygen content of the exhaust gas in the diagnosis period from the reference value for the oxygen content of the exhaust gas is dependent on an integral of the sequence of measured values of the deviations of the captured oxygen content of the exhaust gas in the diagnosis period from the reference value for the oxygen content of the exhaust gas.

18. The device according to claim 13, wherein the characteristic value for the deviation of the oxygen content of the exhaust gas in the diagnosis period from the reference value for the oxygen content of the exhaust gas is dependent on a temporally weighted integral of the sequence of measured values relative to the reference value for the oxygen content of the exhaust gas.

19. The device according to claim 13, wherein the characteristic value for the deviation of the oxygen content of the exhaust gas in the diagnosis period from the reference value for the oxygen content of the exhaust gas is dependent on an integral, which is weighted relative to an exhaust gas mass flow, of the sequence of measured values relative to the reference value for the oxygen content of the exhaust gas.

* * * * *